United States Patent [19]

Van Devender

[11] Patent Number: 5,611,591
[45] Date of Patent: Mar. 18, 1997

[54] SUPPLEMENTAL SUN VISOR

[76] Inventor: Daphne E. Van Devender, 4155 Fuller St., Eugene, Oreg. 97402

[21] Appl. No.: 541,733

[22] Filed: Oct. 10, 1995

[51] Int. Cl.$^6$ ........................................ B60J 3/00
[52] U.S. Cl. .............................................. 296/97.6
[58] Field of Search .................... 296/97.6, 97.9

[56] References Cited

U.S. PATENT DOCUMENTS

| | | | |
|---|---|---|---|
| 2,231,641 | 2/1941 | Schwab | 297/97.6 |
| 2,458,125 | 1/1949 | Winkler | 296/97.6 X |
| 2,528,038 | 10/1950 | Crise | 296/97.6 X |
| 2,542,409 | 2/1951 | Guenther | 296/97.6 |
| 2,842,395 | 7/1958 | Davis | 297/97.6 |
| 3,961,820 | 6/1976 | Spangler | 296/97.6 |
| 4,195,876 | 4/1980 | Timperio | 296/97.6 |
| 5,044,685 | 9/1991 | Yang | 296/97.6 |
| 5,165,748 | 11/1992 | O'Connor | 296/97.6 |
| 5,427,427 | 6/1995 | Holter | 296/97.6 |

Primary Examiner—Andrew C. Pike
Attorney, Agent, or Firm—James D. Givnan, Jr.

[57] ABSTRACT

A supplemental visor includes sets of U-shaped clips with an elastic strap joining the clips of each set for biased attachment to the opposite edges of a vehicle sun visor. Clips of each set include a sleeve shaped member which receives a hinge pin integral with a translucent glare shield. The hinge pin carries an elastomeric material to ensure adequate frictional engagement with the sleeve shaped members. The glare shield is of a suitable translucent material such as a material responsive to different amounts of light.

3 Claims, 1 Drawing Sheet

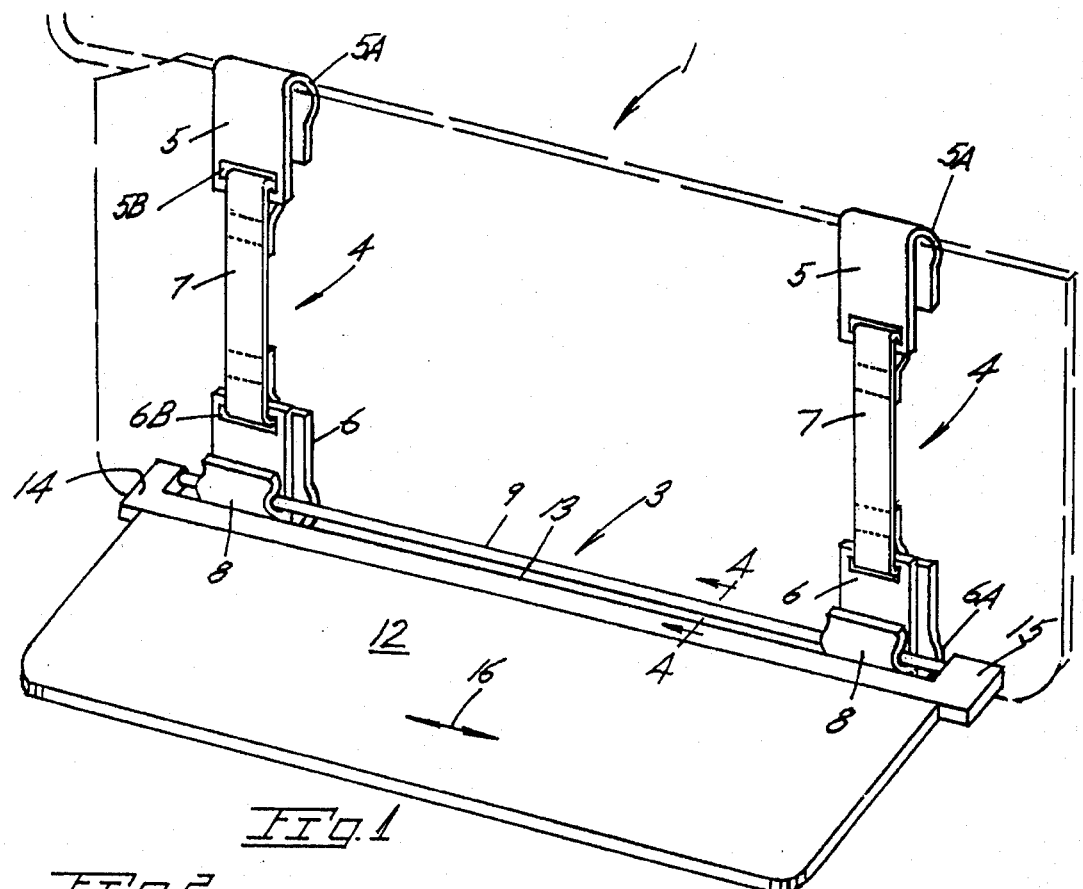
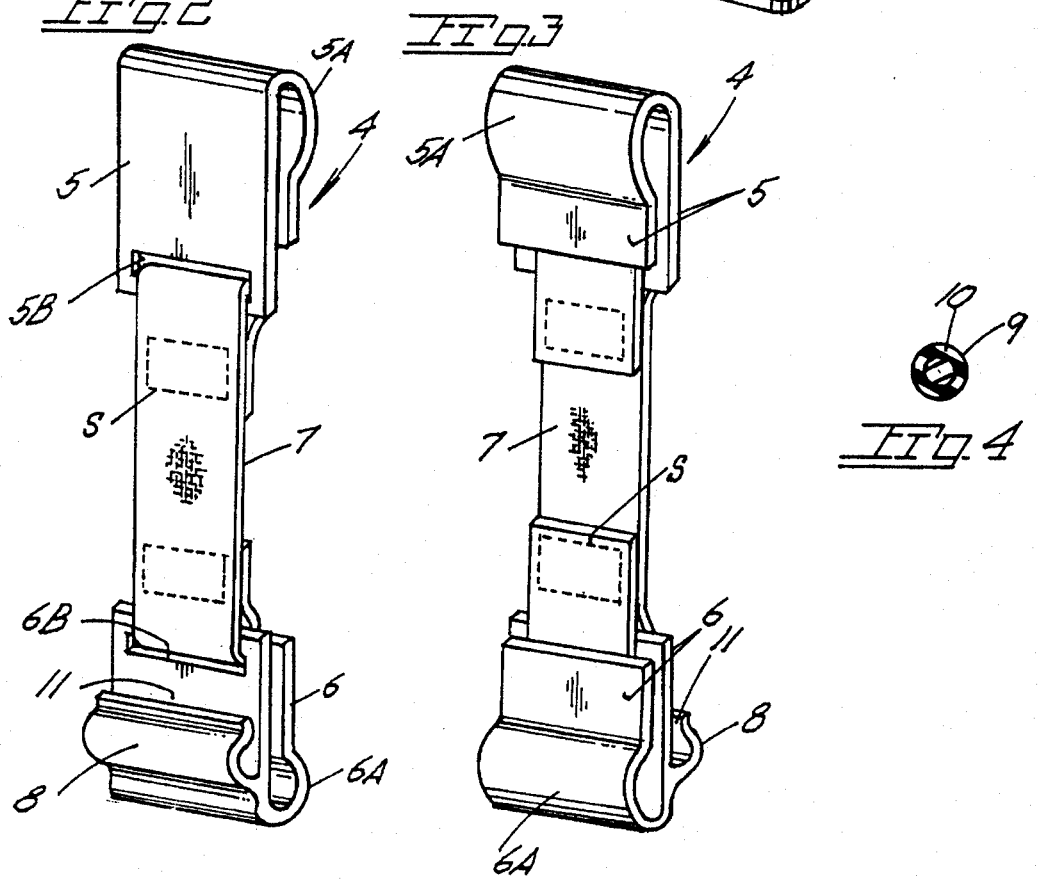

SUPPLEMENTAL SUN VISOR

BACKGROUND OF THE INVENTION

The present invention pertains generally to an auxiliary sun visor attachable to an automobile sun visor.

Various styles of auxiliary sun visors are found in the prior art which are directed toward supplementing the function of the permanent sun visor of the automobile. Prior art visors are mountable in a detachable manner on the permanent visor by various arrangements. For various reasons, some not readily apparent, no specific design of auxiliary or supplemental visor has currently found wide acceptance with automobile owners. Problems encountered in the task of providing such a visor include achieving a low cost of manufacture, adaptability to a wide range of permanent visor dimensions, ease of visor attachment, and prevention of undesired visor movement from vibration or loads imparted during vehicle travel.

In the prior patents U.S. Pat. No. 5,427,427 shows a supplemental visor held in place by a single clip and by an adjustable band extending about the visor of the automobile. U.S. Pat. No. 3,961,820 shows a visor attached by a pair of hooks about the upper edge of the automobile visor. U.S. Pat. No. 5,165,748 shows a supplemental visor attached by a pair of straps having fabric closure material. U.S. Pat. No. 2,842,395 shows the installation of a supplemental visor using a sleeve slid lengthwise onto a visor of the vehicle with a lengthwise extending hinge supporting the supplemental visor. U.S. Pat. No. 2,231,641 shows a supplemental visor attached to a visor with a single clip in-engagement with the visor of the automobile.

SUMMARY OF THE PRESENT INVENTION

The present invention is embodied in an auxiliary sun visor readily installable on an automobile sun visor and directed toward overcoming the above mentioned visor problems.

In the present visor, pairs of U-shaped clips are each biased into visor engagement by elastic straps. One clip of each pair additionally includes sleeves in which is received a rod member with the latter in snug frictional engagement with the sleeves. Contributing to frictional engagement is an elastomeric material on the rod. The auxiliary visor proper is carried by said rod and accordingly remains in place where positioned regardless of vibration and loads encountered during automobile travel. An appendage on the visor provides a convenient finger grip for visor positioning. The present visor provides a glare shield which may be formed from material commonly found in sunglasses and responsive to light waves to vary transmission of same.

Important objectives of the present visor include the provision of a visor of low cost of manufacture with the clips parts capable of being extruded; the provision of a visor readily attached to various automobile or truck visors and having a glare shield not susceptible to displacement during automobile travel; the provision of a visor with few parts and readily assembled during manufacture and the provision of a visor with a photosensitive glare shield.

BRIEF DESCRIPTION OF THE DRAWINGS

In the drawings:

FIG. 1 is a perspective view of the present visor in place on an automobile sun visor;

FIGS. 2 and 3 are front and rear perspective views of a clip set of the present visor; and FIG. 4 is a cross-sectional view taken along line 4—4 of FIG. 1 of a visor hinge pin.

DETAILED DESCRIPTION OF THE PREFERRED EMBODIMENTS

With continuing attention to the drawings, the reference numeral 1 generally indicates a visor permanently affixed to an automobile, truck, etc. in a manner permitting typical movement about multiple axes. An arm supports the visor.

The present visor is indicated generally at 3 and includes sets of U-shaped clips generally at 4. The clips at 5 and 6 are bowed at 5A and 6A to facilitate flexing of the clips for convenient affixing to visor 1. Slots at 5B and 6B receive an elastic strap 7 which is reversed at its ends and stitched at S. A hinge member at 8 on each clip is of a somewhat flexible nature to receive and grip a hinge pin 9 inserted through a bite area 11. To enhance frictional engagement of pin 9 with hinge members 8 the pin is provided with an elastomeric sleeve or coating 10.

A visor glare shield is at 12 and has a recessed edge 13 to avoid a sight gap between proximate edges of the visor. Ears at 14 and 15 carry pin 9 for rotation with the supplemental visor. End member 15 is preferably of a size to serve as a finger grip for convenient tipping of visor 3 from a raised position alongside visor 1 or a depending position below visor 1.

Installation of the supplemental visor entails the placement of the sets of clips generally at 4 in place in vehicle visor 1. The straps 7 yield to accommodate a range of different visor widths. Pin 9 is then urged into the hinge members 8 which grip pin 9 to provide moderate resistance to rotation of the pin and movement of visor 3 to prevent undesired visor movement.

The clips 5 and 6 firmly engage the opposite margins of visor 1 with supplemental visor 3 being offset laterally to permit visor 3 to be rotated into a desired position without interference from vehicle visor 1. Re-installation of the supplemental visor on a visor of another vehicle entails simply the lifting of a pair of clips 5 or 6 out of engagement with visor 1, as permitted by elastic straps 7, and the subsequent slipping of the remaining pair of clips 5 or 6 off of visor 1. Lengthwise movement of hinge pin 9, to the extent possible, i.e., until contact of either finger grip 14 or 15 with a clip 6, permits the supplemental visor to be horizontally offset to one side or the other of vehicle visor 1 per arrow 16. For this purpose, the paired clips may be installed closer to one another than as shown in FIG. 1.

Glare shield 12 may be formed from suitable glare reducing translucent material including that having a polarizing effect or photochromic material which darkens or lightens in response to changes in the amount of light present.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An auxiliary sun visor for attachment to a permanent visor of a vehicle, the auxiliary sun visor including:

sets of U-shaped clips for engagement with opposite edges of the permanent visor, elastic straps for urging the clips of each set toward one another and into engagement with the permanent visor, a hinge member integral with one clip of each of said sets of U-shaped clips, a glare shield of elongate shape, a hinge pin carried by said glare shield and extending substantially a length of the glare shield, and an elastomeric sleeve about said hinge pin, said hinge member on said one clip of each of said sets being in biased engagement with said elastomeric sleeve on said hinge pin and preventing undesired rotation of the hinge pin and the glare shield when subjected to vibration and loads encountered during travel of the vehicle, said sets of U-shaped clips being of extruded material.

2. The sun visor claimed in claim 1 wherein said U-shaped clips define slots, said elastic straps passing through said slots interconnecting the clips of each of said sets of clips.

3. An auxiliary sun visor for attachment to a permanent visor of a vehicle, the auxiliary sun visor including:

first and second sets of U-shaped clips for engagement with opposite sides of the permanent visor, said clips having bowed portions to facilitate flexing of the clips, elastic straps urging the clips toward one another and into engagement with the permanent visor, hinge members one each on a clip of each of said first and second sets of clips, a glare shield of elongate shape and including fingergrips for grasping during adjustment of the glare shield, and a hinge pin carried by said glare shield and extending substantially a length of the glare shield, said hinge pin carries a sleeve of elastomeric material to enhance frictional engagement with the hinge members, said hinge members being integral respectively with said clip of each of said first and second sets of clips and at all times in biased gripping engagement with said hinge pin and preventing undesired rotation of the hinge pin and the glare shield when subjected to vibrations and loads encountered during travel of the vehicle.

* * * * *